United States Patent [19]

Bentley et al.

[11] 4,263,597
[45] Apr. 21, 1981

[54] NONDISRUPTIVE ADF SYSTEM

[75] Inventors: Wm. F. Bentley, Smyrna; Arthur Luedtke, Marietta; James E. Scott, Austell, all of Ga.

[73] Assignee: The United States of America as Represented by Field Operations Bureau of FCC, Washington, D.C.

[21] Appl. No.: 78,360

[22] Filed: Sep. 24, 1979

[51] Int. Cl.³ .................................................. G01S 5/04
[52] U.S. Cl. ................................. 343/121; 343/113 R
[58] Field of Search .................... 343/113 R, 119, 121, 343/122, 123

[56] References Cited

U.S. PATENT DOCUMENTS

| 2,929,056 | 3/1960 | Page | 343/123 |
| 4,025,924 | 5/1977 | Luedtke et al. | 343/121 |

Primary Examiner—Theodore M. Blum
Attorney, Agent, or Firm—Wm. Ferrel Bentley

[57] ABSTRACT

An automatic radio direction finding (ADF) system having inputs for four quadrature antennas each having a cardioid pattern. Each input is amplitude modulated in quadrature and then combined in a hybrid circuit to produce a nondirectional pattern. The combined rf signal is carried through the receiver as a normal signal and the AM detected intermediate frequency of the receiver is fed to a processor. The sum quadrature modulation is recovered, filtered, and accumulated in such a manner that random signals will cancel and any repetitive signals at the modulation frequency will increase in amplitude and be stored. The vector information of this recovered modulation when decoded with respect to the phase of the original modulation, contains the actual bearing information. The signal is then averaged over several cycles and displayed in digital format in degrees of azimuth with respect to car heading. This averaging eliminates jitter in the last digit of the numerical readout. A second display a circular bar-graph, also uses averaging to remove jitter and gives the operator a much better indication of the tendencies of a changing bearing. Therefore, when used as a mobile DF, the bar-graph is the more useful of the two displays, and conversely the numerical readout is superior for a fixed site.

17 Claims, 4 Drawing Figures

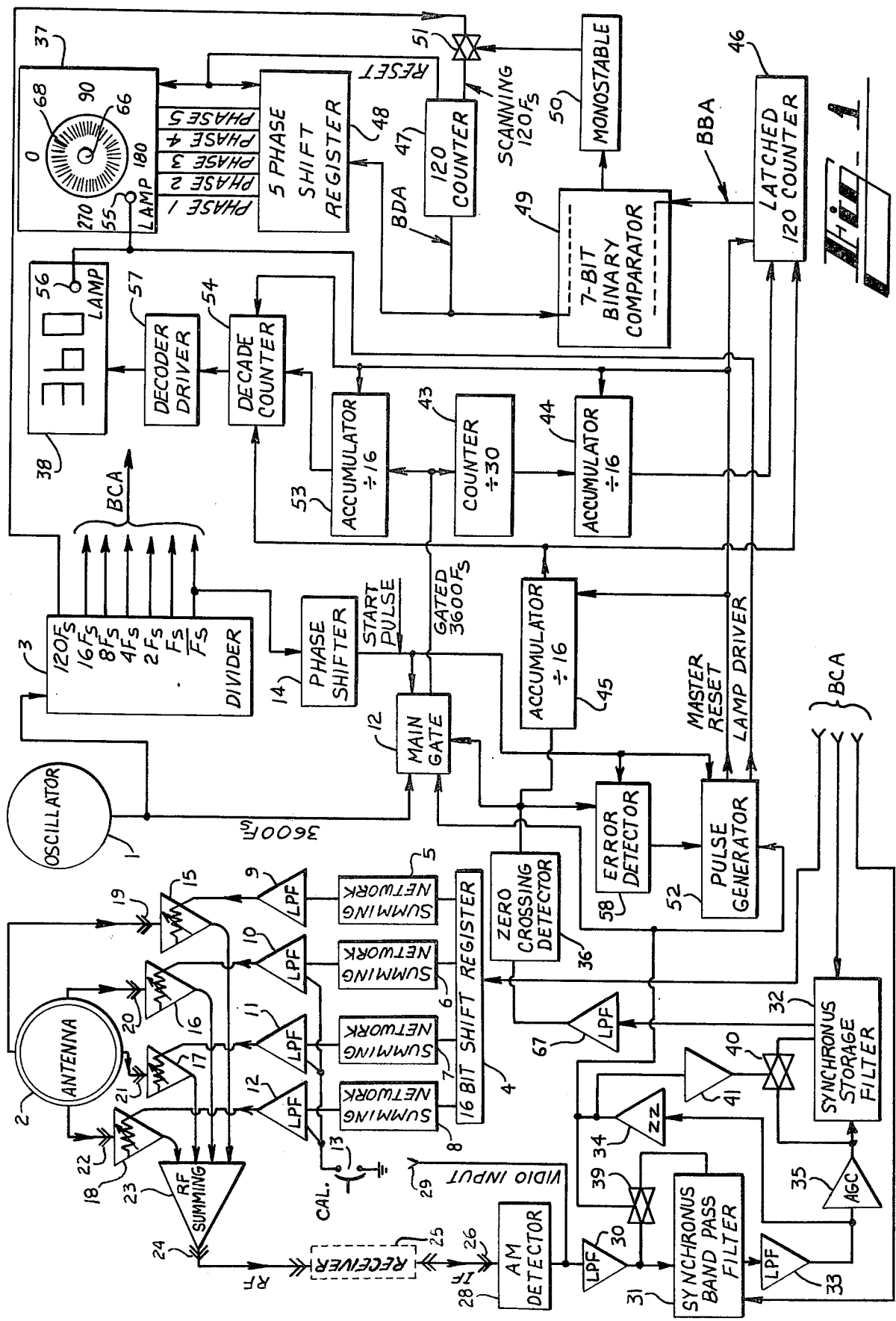

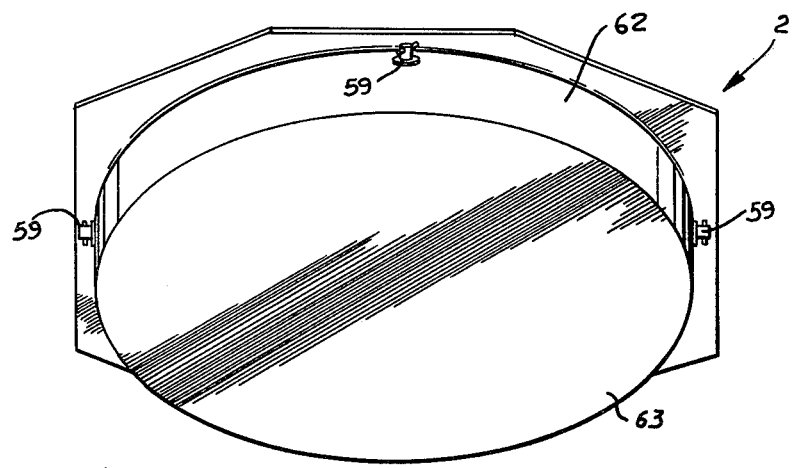
*Fig_2*
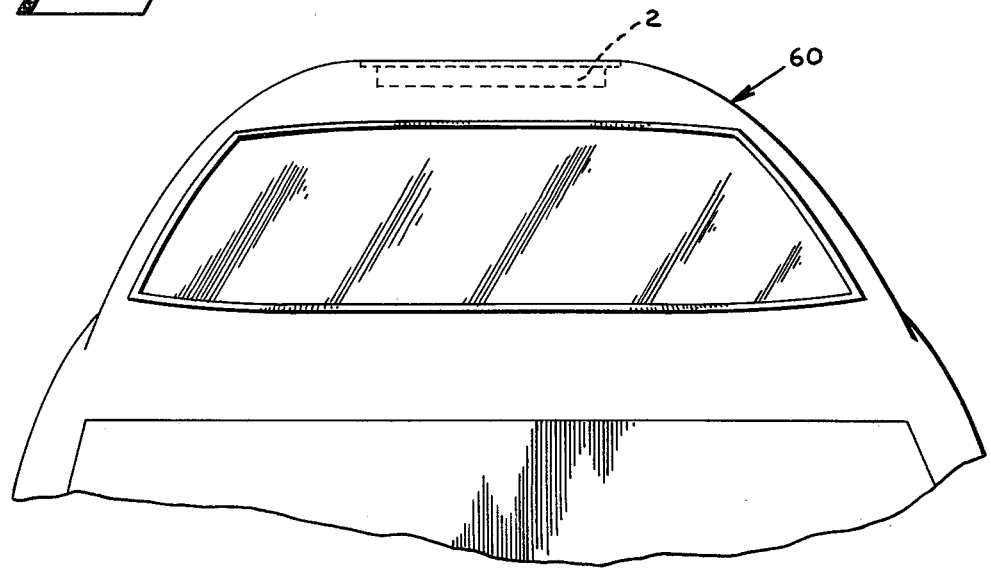
*Fig_3*
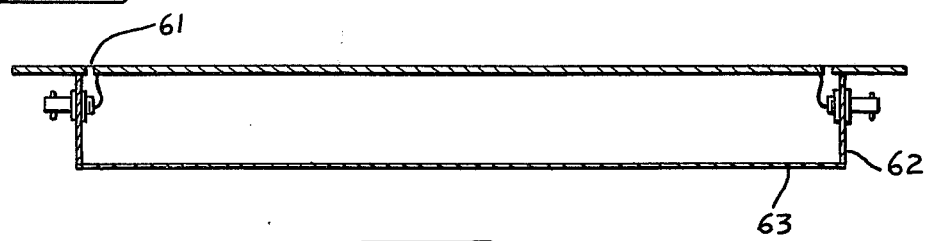
*Fig_4*

NONDISRUPTIVE ADF SYSTEM

BACKGROUND OF THE INVENTION

1. Field of the Invention

This invention relates to radio frequency automatic direction finding systems and, particularly, to an automatic direction finding system utilizing amplitude modulation impressed on the received radio frequency signal. It concerns circular antenna array systems that continuously observe a complete 360 degrees in azimuth to instantly determine the direction of an incoming signal. This is a narrow aperture type direction finding system in which the diameter of the antenna is always less than one half wavelength.

2. Description of the Prior Art

Radio direction finding has long been used by aircraft and marine service to determine the location of the receiving station as an aid for navigation. The ADF systems which are commercially available usually consist of a sense antenna, a loop antenna, and a combiner/phase shifter to form a special pattern. This type of ADF usually operates over a narrow band of one octave or less and is limited to a number of discrete frequencies with a special dedicated receiver.

Other methods use mechanical rotation of loops or other directional antennas. Mechanical systems, besides being bulky and unsightly, require a large amount of power and have all of the problems associated with physically rotating an antenna. Still other systems derive the bearing information by use of the null, rather than lobe because the null is narrow and will provide more accuracy when adequate signal strength is available. The primary disadvantage of the null type DF or the rotating directional antenna is that the signal is always fading in and out destroying the intelligence. Another problem with conventional automatic direction finding systems utilizing the null is that under weak signal conditions the signal strength approaches the sensitivity threshold of the receiver, thereby broadening the width of the null and limiting the system accuracy. Furthermore the time required to obtain a bearing is on the order of several seconds creating a particular problem with unlicensed transmitters because the signal may not stay on very long.

Automatic direction finding systems which utilize the doppler principle produce excessive switching noise on the signal. Low switching rates in or below the audio range generally produce significant problems in detection of the transmitted intelligence. As the switching rate is increased, the system bandwidth must be increased correspondingly, thereby sacrificing system selectivity. However, even in the more advanced systems where the chopping rate is well above audio, the switching transients still disrupt the intelligence on the signal. Additionally the requirement of an omnidirectional pattern for each of the antennas in a doppler array usually limits the practical bandwidth because the gain of the antennas falls off very rapidly with decreasing frequency.

SUMMARY OF THE INVENTION

It is an object of this invention to provide a new and improved automatic direction finding system that has extremely wide frequency capability and is non-disruptive to the modulation that is already on the signal. Another object of this invention is to provide a novel ADF system that does not require the use of motors, servos, or rotating antennas. Further, the system will have automatic direction finding capability for all types of received signals regardless of the modulation on the signal, whether it be AM, pulse, or wide or narrow band FM. Additionally, standing waves caused by nearby metal objects, power lines, railroad tracks, and steel buildings can cause significant differences in the bearing. These standing waves will cause bearing error at any one location, the error may add or subtract to the correct bearing, but will integrate into a correct bearing over several wavelengths. The ADF system will provide means for averaging, and integrating of the coherent signal and will then store the bearing. It will have the ability to accurately indicate the bearing in degrees as well as display to the operator the relative direction from which the signal is coming. Other objects of the invention are to have the system display an accurate bearing in less than one-half second, and to be physically small and capable of utilizing an antenna that can be made non-obvious on a normal automobile.

CROSS—REFERENCES TO RELATED APPLICATIONS

The ADF system can use any antenna which has three or more outputs which are active at all times and presents cardioid pick-up patterns with angular symmetry at these outputs. A particular type of antenna useful in this application is shown on the drawing for illustration and was filed Mar. 14, 1979 with application no. 20,295. The pick-up elements of the antennas must be less than quarter wave apart such that when the outputs are summed vectorally the result will be a circular pattern in azimuth.

BRIEF DESCRIPTION OF THE DRAWING

The invention will be readily understood in light of the description of the embodiment of the present invention which follows. In the drawings which form part of the disclosure, like reference numerals refer to like elements.

FIG. 1 illustrates the complete block diagram of the preferred embodiment of the ADF system.

FIG. 2 illustrates a perspective view of the preferred embodiment of the antenna from below.

FIG. 3 illustrates the embodiment of the antenna system as installed in an automobile.

FIG. 4 illustrates a plane section view of a simplified single slot antenna.

DESCRIPTION OF THE PREFERRED EMBODIMENT

The oscillator 1 originates the waveforms generated to modulate the antenna patterns, the signals that scan the bar-graph display 37 and the signals that control the filtering of the bearing information from the receiver. The antenna 2 is scanned at a discrete frequency which shall be referred to as Fs. The oscillator 1 oscillates at a rate of 3600 Fs and the divider 3 has outputs at multiples of Fs for the purpose of synchronizing the separate functions of the ADF system. All the outputs of the divider 3 except 120 Fs shall be defined as the Binary Control Address (BCA). Shift register 4 uses the BCA to generate four quadrature sine waves of equal amplitude. It is loaded at an Fs rate and clocked at a 16 Fs rate. Eight successive outputs of the shift register drive weighting resistors of selected values to summing networks 5, 6, 7, 8 such that as the shift register outputs progressively all go to a high logic state and then all return to a low logic state, a sixteen step approximation of a sine wave is formed at each of the common connections of the summing networks. These stepped waveforms are passed through low pass active filters 9, 10, 11, 12 to convert them to low distortion sine waves at the frequency Fs; each wave form is generated 90 degrees from the previous waveform. The calibrate switch 13 turns off three of the active filters 10, 11, 12, leaving only one of the Fs voltages present at the output of the filter 9. Now the total system can be calibrated by shifting the start pulse in the phase shifter 14, to compensate for distortion and phase delay. This makes it possible to use a broader range of receivers and various bandpass filters in the receivers. The four quadrature voltages from the active filters 9, 10, 11, 12 control the RF modulation 15, 16, 17, 18 which impress a 30% quadrature AM modulation on each of the RF inputs 19, 20, 21, 22. The RF signal input is derived from the antenna 2 which has four quadrature cardioid patterns with a spacing of less than one quarter wavelength. The antennas are phased such that they will sum into a circular pattern after being modulated at Fs in the modulators 15, 16, 17, 18.

The bandwidth and flatness of the RF modulators and the gain and uniformity of the cardioid lobes are the only limiting factors for this ADF system. Both the modulators and the antennas can be made very broad and can be switched in sets such that the overall bandwidth of the system can be extremely broad. The present system as constructed uses a three ring annular slot and two sets of RF modulators to cover a range of 0.5 MHz to 1000 MHz. Except for the physical size limitation at the low end and the problems of manufacture at the high end there are no theoretical restraints for the frequency range using this type of antenna.

The quadrature modulated RF signals are summed in a zero degree hybrid combiner 23. The RF output 24 of the combiner 23 feeds receiver 25 which is capable of processing a signal containing low frequency AM modulation with minimum distortion and delay. The IF signal from the receiver is connected to input jack 26 and then processed by the AM detector 28. Another input 29 is available for receivers which have a video rather than IF type of output. Either the signal from detector 28 or the video input 29 is fed through a low pass filter 30 to eliminate most of the intelligence and to recover the low level Fs amplitude modulation that was superimposed on the received signal by the RF modulators.

The input sensitivity or low level response of any filter is dependent on its passband. As the bandwidth of the filter gets narrower the component values become more and more critical. The frequency stability also becomes critical since any frequency change would not only change the amplitude but the phase shift. The response time of the filter likewise increases significantly as the bandwidth decreases. To overcome these difficulties rotary synchronous filters are used. Each is a sixteen step shunt type filter with extremely sharp high pass cut off above the fundamental Fs frequency. The synchronous filters 31, 32 are driven by the BCA at 16 Fs, provide enhancement for coherent signals of frequency Fs while attenuating non-coherent signals. The phase of the recovered Fs signal referenced to the BCA represents the bearing of the received signal. The signal enters the first synchronous filter 31 which momentarily stores the waveform in sixteen time division multiplexed capacitors. The stepped output waveform feeds a low pass filter 33 which smoothes the steps by removing the higher order harmonics; the waveform then continues on to both the squelch circuit 34 and the AGC amplifier 35. The amplifier 35 compensates for different output levels from various receivers and holds the level out of the filters to a narrow range. The AGC is necessary to keep following circuits operating in their optimum ranges reducing the error in the zero crossing detector 36. The filtered and leveled signal from the AGC amplifier 35 enters a second synchronous filter 32 which is similar to the first one but has a much longer time constant to provide averaging and storage of the signal. The storage time allows the squelch 34 to turn off before the output level can drop enough to cause a bearing error in the displayed value; when the squelch 34 is turned off the output displays 37, 38, are frozen and will continue to display the last value of the filter. The output of filter 32 is filtered by low pass filter 67 to again remove higher order harmonics after which the zero crossing detector 36 produces a stop pulse corresponding to the zero crossover. The first synchronous filter 31 initially has a 3 ms time constant and is switched to 15 ms when the squelch 34 is turned on indicating that a signal is present and the filter is loaded with bearing information. The rising squelch 34 also changes the state of the gate 39 which controls the time constant of filter 31 and triggers one shot 41 which turns on gate 40 which controls the time constant of filter 32. This filter 32 which initially has a 100 ms time constant momentarily switches to 1 ms time constant for 470 ms when the output of the one shot 41 goes high. This allows the incoming signal to charge the first filter 31 rapidly and dump a preliminary bearing into the second filter 32. Then the system slowly integrates new data into the bearing for signal enhancement yielding greater accuracy. It is important to get a quick bearing even if it has some error; then, if the signal stays on long enough, integrate it into a more accurate bearing. The integration of the filters also removes short term fluctuations of the RF signal and because of the movement of the vehicle, increases the effective aperture of the antenna system.

In order to keep the disturbance to the intelligence low, the modulation is kept as low as possible at each of the RF modulators. When combined the total modulation is less than 10%. This low level modulation would not normally be heard because the frequency is in the low audio range where the response of a communications receiver is down 10 dB and the response of the small speaker normally used is down another 10 dB.

The bearing data itself is derived by counting gated pulses from the 3600 Fs reference signal. As the input signal rises above the set squelch level the squelch output 34 rises and sets the main gate 12 so that the gate will open on the rise of the next start pulse from the adjustable phase shifter 14. The main gate 12 is closed at the rise of the next stop pulse, which comes from the zero crossing detector 36. The number of pulses at the 3600 Fs rate which pass through the main gate while it is open represents the bearing to 0.1 degree resolution but because of system fluctuations any readouts at this point would be unuseable. Instead the pulses are divided by thirty in the counter 43 to produce gated 120 Fs. The bearing information is then averaged in the accumulator 44 by dividing the gated 120 Fs by sixteen. Accumulator 45 divides the stop pulse by sixteen also and the output is used to stop the counter 46 as it counts the output of accumulator 44. The counter 46 provides data referred to as the binary bearing address (BBA) through a latched output. The 120 counter 47, meanwhile, counts the ungated 120 Fs from the divider 3 and provides a binary display address (BDA). The decimal equivalent of the BDA is the number of the corresponding segment of the 120 element bar-graph circle. The shift register 48 takes the BDA and produces synchronized five phase driving voltages from the scanning of the bar-graph display 37. The counter 47 also generates the pulse to reset itself and the dislay.

The binary comparator 49 compares the BBA latched at the output of counter 46 with the BDA from counter 47. When the two seven bit words are identical, the comparator output triggers monostable 50 whose output turns off the scanning gate 51 for the duration of the monostable's pulse. While the scanning gate 51 is off, clocking is momentarily stopped for the counter 47, which also stops the five phase shift register 48 and the self scanning display 37. Since the segment 68 of the display at which the scanning stops is illuminated for a much greater period of time than the other segments, it then becomes an intensified cursor in a circle of light to indicate the bearing of the received signal. The contrast between the cursor and the other segments is set by the pulse width of the monostable 50. At the end of this pulse the scanning gate 51 is turned back on and the counter 47, shift register 48, and display 37 resume clocking until the counter 47 reaches 119 where it resets itself. Then the scanning begins again at zero while the comparator seeks a new match to an updated BBA, at which time the cursor is again generated. When there is no signal the squelch circuit of the system prohibits counter 46 from updating and the last bearing address remains stored in its output latch. Therefore, a cursor will continue to be generated at the bearing of the last received signal. Simultaneously accumulator 53 uses the gated 3600 Fs and accumulates sixteen bearing samples after which it is counted by a decade counter 54. Then a decoder driver 57 takes the output from the counter and drives the display 38 indicating the bearing numerically in degrees. A numeric display with one degree resolution and a circular bar-graph display with three degree resolution are used in this embodiment. When a new signal is received the squelch circuit opens, and pulse generator 52 activates the master reset. This sets up the accumulators 44, 53, 45, and the counters 46, 54, so that they all start on a new count from zero. When the displayed bearing is from memory instead of an active signal the output of the squelch 34 sets the pulse generator 52 such that the indicating lamps 55 and 56 are off.

The error detector 58 generates a pulse resetting all counters and accumulators when the bearing shifts between 359° and zero degrees during the time the main gate is open. The error detector prevents erroneous bearings from being generated by averaging between zero pulses and 3600 pulses with a resultant bearing near 180°. Both displays will then display zero instead of 360 degrees.

To eliminate the possible glare problem a circular polarizer is used in front of the bar-graph display. A linear polarizer is placed in front of the display and the circular polarizer which can be rotated by means of the knob 66. When these two polarizers approach the crossed position the light transmitted through will be reduced controlling the intensity of the display.

FIG. 2 illustrates the antenna 2 which has four quadrature cardioid pick up patterns which are available at the output ports 59. FIG. 3 illustrates how the antenna 2 would typically be installed in an automobile 60. FIG. 4 illustrates the section view of a simple single slot antenna showing the slot 61, the output ports 59 with the side walls 62, and the bottom cover 63 which forms the cavity. The actual antenna in the preferred embodiment may utilize one or more concentric slots with respective cavities and output ports; the single slot antenna is shown for clarity.

Various modifications are contemplated and it is understood that certain features and subcombinations are of utility and may be obviously resorted to by those skilled in the art without reference to other features and subcombinations. As only the preferred embodiment thereof has been disclosed there are many possible embodiments of the invention without departing from the spirit and scope of the invention thereof.

We claim:

1. An automatic direction finder system for instantaneously determining the direction of the location of a radio frequency source, with respect to the receiving location comprising:
a regular polyangular directional antenna array which has three or more antennas equally spaced in azimuth with the diameter of the array not less than three-eights wave length at the highest operating frequency to receive the radio frequency signal in uniform phase relationship, each directional pattern being of identical cardioid shape and of equal value; a controlling means for synchronizing the system; a driver means creating the sine wave driving voltage to modulate the RF from the antenna; a combiner means and receiver means which process the RF signal and has an output for a detector means; processing means to filter the detector output then store and integrate the bearing to enchance the accuracy; error detecting means and display means to display the bearing information; bearing status indicating means to display the current state of the indicated bearing.

2. A direction finding system of claim 1 in which the antenna is a single antenna with regular-angle feed means attached.

3. A direction finding system of claim 1 in which the controller consists of a crystal oscillator with frequency at least 3600 times the basic rotation rate of the ADF, with a divider to produce the multiples of the rotation rate that are needed to control the system.

4. A direction finding system of claim 1 in which the antenna driver means consists of a shift register and summing resistors to create stepped sine waves uniformly spaced from zero to three hundred and sixty degrees followed by low pass filters to act as drivers for each of the modulators, the driving voltages going to zero on all but the straight ahead antenna when calibrate is activated.

5. A direction finding system of claim 1 in which the modulators are constructed using pin diodes in an L pad configuration providing both constant impedance and broad bandwidth at the input and having an integral combiner, providing a wideband uniform response at the output.

6. A direction finding system of claim 1 in which the detector means consists of an AM detector with short phase delay with provisions for processing a signal that is already AM detected.

7. A direction finding system of claim 1 in which the processing means consists of a low pass filter to remove the intelligence from the signal while retaining the added modulation which drives a level detector to control the bearing indicator means and fast charge gates on the filters.

8. A direction finding system of claim 1 in which the processing means also contains an AGC means and synchronous filters for signal enhancement and integration of data.

9. A direction finding system of claim 1 in which the processing means also consists of a synchronous filter for storage of the bearing information, and a zero crossing detector to trigger the indicating means.

10. A direction finding system of claim 1 in which the bearing is determined by the number of pulses that pass through a gate that is opened by the start pulse of the controller and closed by the stop pulse from the zero crossing detector.

11. A direction finding system of claim 1 in which the output display is a counter driving a numeric display which holds the previous bearing until a new signal is processed to update the display.

12. A direction finding system of claim 1 in which the output display is a circular bar-graph display with an intensified cursor to indicate the bearing, with the relative intensity controllable time division and the absolute intensity controlled by the angle between polorized filters.

13. A direction finding system of claim 1 in which the error control circuit detects the 359 to 360 degree transition and resets the output counter to zero degrees under those conditions.

14. A direction finding system of claim 1 in which preliminary bearing information from a signal is forced into the storage means in only a few cycles.

15. A direction finding system of claim 1 in which the output of the squelch circuit controls a display lamp indicating whether the bearing being displayed is from stroage or one now being continually updated.

16. A direction finding system of claim 1 in which the signal processor has means for accumulating two or more bearing and dividing by the number of accumulations to remove jitter and short term fluctuation from the output.

17. A direction finding system of claim 1 in which synchronous filters charge storage capacitors at a synchronous rate allowing new coherent information to build up while discriminating against non-coherent data.

* * * * *